(12) United States Patent
Raun et al.

(10) Patent No.: US 6,880,291 B2
(45) Date of Patent: *Apr. 19, 2005

(54) PROCESS FOR IN-SEASON FERTILIZER NUTRIENT APPLICATION BASED ON PREDICTED YIELD POTENTIAL

(75) Inventors: William R. Raun, Stillwater, OK (US); Gordon V. Johnson, Stillwater, OK (US); John B. Solie, Stillwater, OK (US); Marvin L. Stone, Stillwater, OK (US)

(73) Assignee: The Board of Regents for Oklahoma State University, Stillwater, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/195,138

(22) Filed: Jul. 12, 2002

(65) Prior Publication Data

US 2003/0019152 A1 Jan. 30, 2003

Related U.S. Application Data

(63) Continuation-in-part of application No. 09/911,867, filed on Jul. 24, 2001, now Pat. No. 6,601,341.

(51) Int. Cl.[7] ............................................. A01C 21/00
(52) U.S. Cl. ............................................. 47/58.15 C
(58) Field of Search ..................... 47/58.15 C, 58.1 R; 382/110

(56) References Cited

U.S. PATENT DOCUMENTS 3,670,963 A   6/1972 Stroebel et al. ............... 239/77
3,910,701 A   10/1975 Henderson et al. ........... 356/39
4,952,229 A   8/1990 Muir ............................. 71/7
5,144,767 A   9/1992 McCloy et al. ............... 47/1.7
5,222,324 A   6/1993 O'Neall et al. ............... 47/1.7

(Continued)

FOREIGN PATENT DOCUMENTS

DE   198 60 306 A1   3/2000
DE   199 13 971 A1   9/2000
WO   WO 01 45490 A1  6/2001

OTHER PUBLICATIONS

Raun et al. 2001. In-season predicting of potential gran yield in winter wheat using canopy reflectance. Agronomy Journal 93: 131-138.*

(Continued)

Primary Examiner—Jeffrey L. Gellner
(74) Attorney, Agent, or Firm—Fellers, Snider, Blankenship, Bailey & Tippens, P.C.

(57) ABSTRACT

A method for in-season macro and micronutrient application based on predicted yield potential and a nutrient response index. The inventive method includes the steps of: determining a nutrient response index for a field; determining the normalized difference vegetation index (NDVI) of an area to fertilize; determining a predicted crop yield for the area; determining an attainable crop yield for the area; determining the nutrient requirement for the area as the difference between the nutrient removal at the attainable yield minus the nutrient removal at the predicted yield, adjusted by the efficiency of nutrient uptake in the particular crop. In one preferred embodiment, processing requirements at the time of application of the nutrient are eased by generating a lookup table of nutrient requirement relative to measured NDVI prior to application of the nutrient.

9 Claims, 8 Drawing Sheets

U.S. PATENT DOCUMENTS

| | | | |
|---|---|---|---|
| 5,296,702 A | 3/1994 | Beck et al. | 250/226 |
| 5,389,781 A | 2/1995 | Beck et al. | 250/226 |
| 5,507,115 A | 4/1996 | Nelson | 47/1.7 |
| 5,585,626 A | 12/1996 | Beck et al. | 250/222.1 |
| 5,606,821 A | 3/1997 | Sadjadi et al. | 47/1.7 |
| 5,763,873 A | 6/1998 | Beck et al. | 250/214 B |
| 5,764,819 A | 6/1998 | Orr et al. | 382/110 |
| 5,768,823 A | 6/1998 | Nelson | 47/1.7 |
| 5,789,741 A | 8/1998 | Kinter et al. | 250/226 |
| 5,793,035 A | 8/1998 | Beck et al. | 250/222.1 |
| 5,809,440 A | 9/1998 | Beck et al. | 701/50 |
| 5,833,144 A | 11/1998 | Kinter | 239/462 |
| 5,837,997 A | 11/1998 | Beck et al. | 250/227.11 |
| 6,052,187 A | 4/2000 | Krishnan et al. | |
| 6,062,496 A | 5/2000 | Kinter | 239/462 |
| 6,160,902 A | 12/2000 | Dickson et al. | 382/110 |
| 6,366,681 B1 | 4/2002 | Hutchins | 382/110 |
| 6,393,927 B1 | 5/2002 | Biggs et al. | |
| 6,444,975 B1 | 9/2002 | Reusch | |

OTHER PUBLICATIONS

Solie, Stone et al. 2000. Inseason N fertilization using an in-season restimate of potential yield. Proceedings of $5^{th}$ Int'l Conf. on Precision Agricultural. unnumbered.*

Yang et al. 2000. Relationships between yield monitor data and airborn multispectral digital imagery. Proceedings of $5^{th}$ Int'l Conf. on Precision Agricultural. unnumbered.*

Staggenborg et al. 2000. Predicting grain yield variability with infrared images. Proceedings of $5^{th}$ Int'l Conference on Precision Agricultural. unnumbered.*

Serele et al. 2000. Dection of corn nitrogen status from airborne vis–Nir imagery using artificial neural networks. unnumbered.*

LaRuffa et al. 2001. Optimum field elements size for maximum yields in winter wheat, using variable nitrogen rates. Journal of Plant Nutrition 24(2): 313–325.*

Stone et al. 1996. Use of spectral radiance for corresponding inseason fertilizer nitrogen deficiencies in winter wheat. Transactions of ASAE 39(5): 1623–1631.*

Solie and Raun. 1996. Optical sensor a=based field elements size and sensing strategy for nitrogen application. Transactions of the ASAE 39(6): 1983–1992.*

Lukina et al. 2001. Nitrogen fertilization optimization algorithm based on in-season estimates of yield and plant itrogen uptake. Journal of Plant Nutrition 24(6): 885–898.*

Patchen Weed Seeker™ PhD1620 Brochure, Undated.

Patchen Weed Seeker™ PhD600 Brochure, Undated.

* cited by examiner

PROCESS FOR IN-SEASON FERTILIZER NUTRIENT APPLICATION BASED ON PREDICTED YIELD POTENTIAL

CROSS REFERENCE TO RELATED APPLICATION

This application is a continuation-in-part of U.S. patent application Ser. No. 09/911,867, filed Jul. 24, 2001, now U.S. Pat. No. 6,601,341.

BACKGROUND OF THE INVENTION

1. Field of the Invention

This invention relates generally to a method for determining a rate of application of fertilizer. More particularly, but not by way of limitation, the present invention relates a method for in-season macro and micronutrient application based on midseason predicted yield potential.

2. Background

Presently, there is a need for a convenient method to determine the amount of fertilizer required to maximize the yield of a particular crop. While soil samples may be analyzed to determine the soil condition, the process is neither convenient nor is it conducive to advanced farming techniques such as precision farming.

"Precision farming" is a term used to describe the management of intrafield variations in soil and crop conditions. "Site specific farming", "prescription farming", and "variable rate application technology" are sometimes used synonymously with precision farming to describe the tailoring of soil and crop management to the conditions at discrete, usually contiguous, locations throughout a field. The size of each location depends on a variety of factors, such as the type of operation performed, the type of equipment used, the resolution of the equipment, as well as a host of other factors. Generally speaking, the smaller the location size, the greater the benefits of precision farming, at least down to approximately one square meter.

Typical precision farming techniques include: varying the planting density of individual plants based on the ability of the soil to support growth of the plants; and the selective application of farming products such as herbicides, insecticides, and, of particular interest, fertilizer.

In contrast, the most common farming practice is to apply a product to an entire field at a constant rate of application. The rate of application is selected to maximize crop yield over the entire field. Unfortunately, it would be the exception rather than the rule that all areas of a field have consistent soil conditions and consistent crop conditions. Accordingly, this practice typically results in over application of product over a portion of the field, which wastes money and may actually reduce crop yield, while also resulting in under application of product over other portions of the field, which may also reduce crop yield.

Perhaps even a greater problem with the conventional method is the potential to damage the environment through the over application of chemicals. Excess chemicals, indiscriminately applied to a field, ultimately find their way into the atmosphere, ponds, streams, rivers, and even the aquifer. These chemicals pose a serious threat to water sources, often killing marine life, causing severe increases in algae growth, leading to eutrophication, and contaminating potable water supplies.

Thus it can be seen that there are at least three advantages to implementing precision farming practices. First, precision farming has the potential to increase crop yields, which will result in greater profits for the farmer. Second, precision farming may lower the application rates of seeds, herbicides, pesticides, and fertilizer, reducing a farmer's expense in producing a crop. Finally, precision farming will protect the environment by reducing the amount of excess chemicals applied to a field, which may ultimately end up in a pond, stream, river, and/or other water source.

Predominately, precision farming is accomplished by either: 1) storing a prescription map of a field wherein predetermined application rates for each location are stored for later use; or 2) by setting application rates based on real-time measurements of crop and/or soil conditions. In the first method, a global positioning system (GPS) receiver, or its equivalent, is placed on a vehicle. As the vehicle moves through the field, application rates taken from the prescription map are used to adjust variable rate application devices such as spray nozzles. A number of difficulties are associated with the use of such a system, for example: due to the offset between the GPS receiver and the application device, the system must know the exact attitude of the vehicle in order to calculate the precise location of each application device, making it difficult to achieve a desirable location size; soil and plant conditions must be determined and a prescription developed and input prior to entering the field; and resolving a position with the requisite degree of accuracy requires relatively expensive equipment.

In the latter method, a sensor is used to detect particular soil and plant conditions as the application equipment is driven through the field. The output of the sensor is then used to calculate application rates and adjust a variable rate application device in real time. Since the physical relationship between the sensor and the application device is fixed, the problems associated with positional based systems (i.e., GPS) are overcome. In addition, the need to collect crop data prior to entering the field is eliminated, as is the need for a prescription map.

With either technique, there is a need to sense the soil and/or crop conditions in order to determine a rate of application of a given farm product. With regard to soil analysis, attempting to analyze the soil condition by way of a soil sample at each site would be time consuming and the handling of individual samples would be a logistical nightmare. Even with in-field analysis, the task would be daunting, at best.

In the past, the measuring of plant reflectance has shown some promise for identifying specific growing conditions. The measurement of plant reflectance is non-invasive to growing crops, may be performed very quickly, and is exceptionally conducive to advanced farming techniques. Unfortunately, there has been no method to interpret such information to determine the application rate of fertilizer. An example of a device which uses reflectance for the selective application of herbicide is described in U.S. Pat. No. 5,585,626 issued to Beck et al.

Thus it is an object of the present invention to provide a convenient method for determining an application rate for the in-season application of nutrients, which is non-invasive to growing crops and is conducive to advanced farming techniques.

SUMMARY OF THE INVENTION

The present invention provides a method for determining in-season macro and micronutrient application based on predicted yield potential and a nutrient response index. In a preferred embodiment of the inventive method, remote sensing is employed to determine plant need for a particular nutrient and to determine mid-season yield potential. An optical sensor is used to measure the reflectance of a target plant at one or more wavelengths of light and, based on known reflectance properties of the target, an output is provided which is indicative of the need for the nutrient. The inventive process is applicable to any crop nutrient whose projected need can be based on predicted removal of the nutrient derived from potential yield. By way of example and not limitation, such nutrients include nitrogen, phosphorus, and potassium.

Efficiency of site-specific nutrient management is largely determined by how well small-scale spatial variability is managed and the time when fertilizers are applied. During the crop growing season (in-season), knowledge of yield potential is a key to successful variable rate nutrient applications. Maximum yield potential ("$YP_{MAX}$") is the theoretical biological maximum for a specific crop, grown within a specific region, and under defined management practices.

In the inventive method, the normalized difference vegetation index ("NDVI") is calculated from reflectance information gathered by scanning a plant. As a preliminary matter, a response index ($RI_{NDVI}$) is calculated, which is a measure of the expected response of the crop to adequate levels of a particular nutrient. $RI_{NDVI}$ is determined by sensing the NDVI of plants in a plot receiving adequate, but not excessive, pre-plant application of the nutrient of interest, divided by the NDVI of plants receiving conventional management.

At a site, NDVI is determined for the site and an in-season estimated yield (INSEY) index is calculated by dividing NDVI by the number of days from planting when the plant is actively growing. INSEY is then used to determine a potential yield ($YP_0$) which is the predicted yield with no additional fertilization. Based on these measurements, the predicted yield which can be attained with added nutrient ($YP_X$) may be projected by the equation:

$$YP_X=YP_0*RI_{NDVI}$$

Through a series of calculations, $YP_X$ is used to determine the mid-season fertilizer requirement for a particular nutrient.

Virtually any method of measuring the reflectance of individual plants or small groups of plants will provide the desired results. However, preferred methods of measuring reflectance include: 1) the use of a passive sensor as described hereinbelow or 2) the use of an active sensor as described in co-pending U.S. patent application, Ser. No. 09/912,077 entitled "Optical Spectral Reflectance Sensor and Controller" which is incorporated herein by reference.

In a preferred method, the reflectance properties of a target are known to be indicative of NDVI which, in turn, is indicative of the expected yield of the target plant. By measuring the reflected light at particular wavelengths, preferably in the ranges of red and near infrared, and the intensity of the light source at the same wavelengths, it is possible to predict, with a reasonable degree of certainty, the expected crop yield with the present level of available nutrients and the maximum crop yield if an amount of nutrient is added. This information may be used in real time to control a viable rate applicator for applying a mid-growing season fertilizer or, alternatively, used to develop a prescription map for later application of mid-growing season fertilizer to a field. The location size in a site-specific application utilizing the present method is limited only by the resolution of the sensor and the resolution of the applicator.

In another preferred embodiment, a response index for a nutrient is determined by first scanning a nutrient rich non-limiting test strip and a strip planted according to the farmer's common practice. The NDVI for each strip is entered into a computer along with the response index, number of growing days since planting, and the maximum potential yield for the crop. Lookup tables are then assembled according to the inventive method such that, for a specific site, the application rate of the nutrient may be drawn from the table based on NDVI at the site, sprayer pressure, and the velocity of the vehicle. These lookup tables are transferred to the application equipment so that as the equipment is passed over a field, reflectance sensors scan each site to determine NDVI and each sensor draws the appropriate sprayer rate from its table and sets its associated sprayer to deliver the proper amount of nutrient to the site. The use of a lookup table dramatically reduces the amount of processing required at the time of application.

Further objects, features, and advantages of the present invention will be apparent to those skilled in the art upon examining the accompanying drawings and upon reading the following description of the preferred embodiments.

DETAILED DESCRIPTION OF THE PREFERRED EMBODIMENT

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1A:
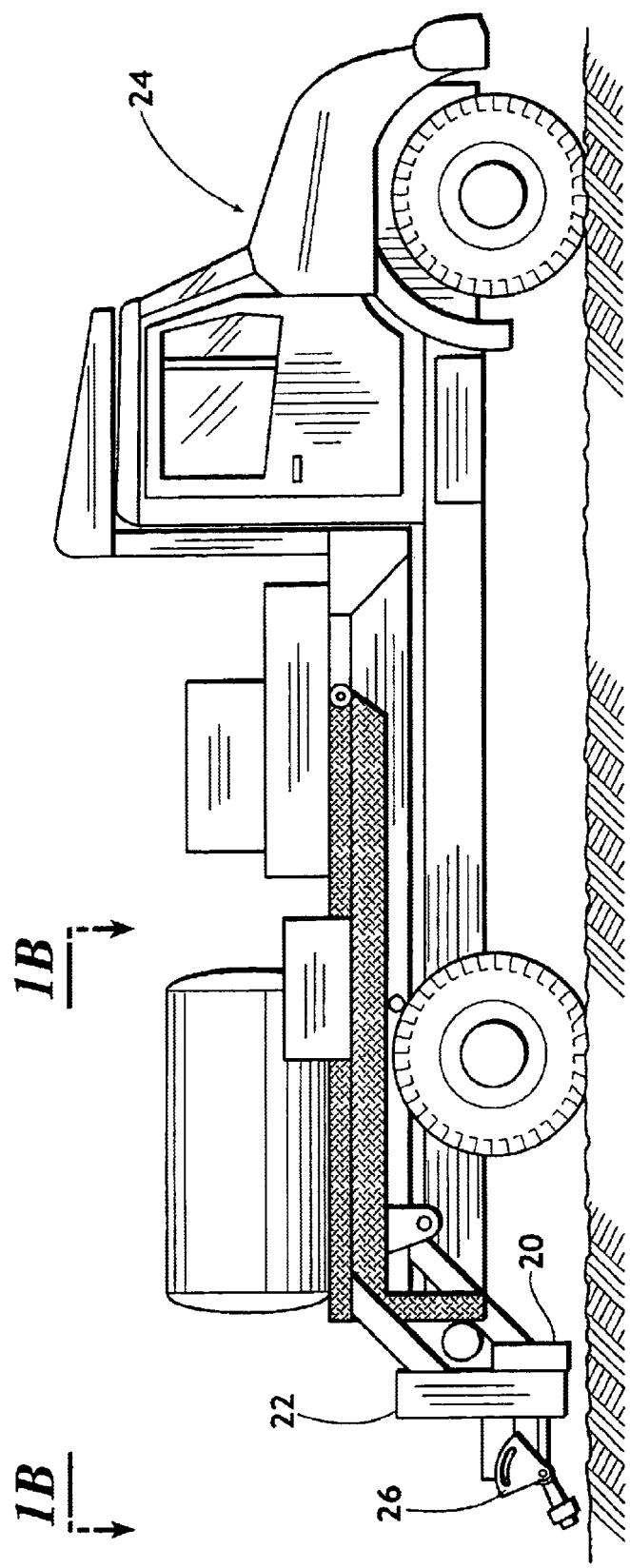
FIG. 1A provides a side view of a farming vehicle having multiple sensors and spray nozzles for use with the inventive method mounted thereon.
Figure 1B:
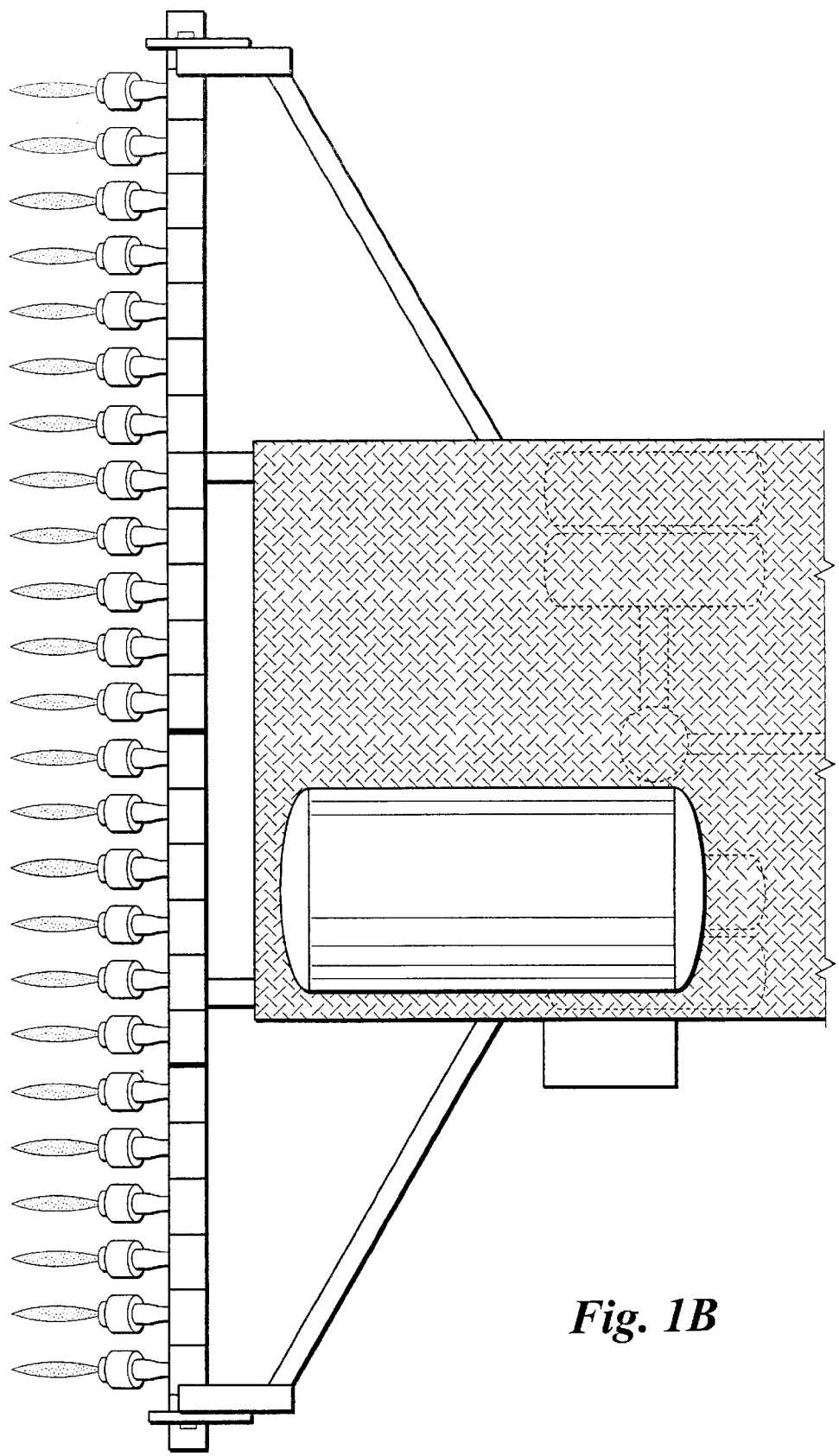
FIG. 1B provides a top view of the farming vehicle having a typical arrangement of sensors and spray nozzles for use with the inventive method mounted thereon.

Referring now to the drawings, wherein like reference numerals indicate the same parts throughout the several views, a preferred embodiment of the inventive method is incorporated in the fertilizer spreading vehicle 24 shown in FIGS. 1A and 1B. Preferably, a plurality of sensors, of which sensor 20 is representative, are disposed along boom 22 at substantially equal spacings. Typically boom 22 extends laterally from vehicle 24. Spray nozzles, of which nozzle 26 is representative, are also disposed along boom 22 preferably such that a nozzle 26, or group of nozzles, corresponds to each sensor 20. As the vehicle 24 travels along a crop row, boom 22 projects over the plants such that each sensor 20 measures the reflectance of plants in its immediate view, determines the extent to which fertilizer is needed according to the inventive method, and controls the rate of application of a nutrient through its corresponding nozzle 26.

Figure 2:
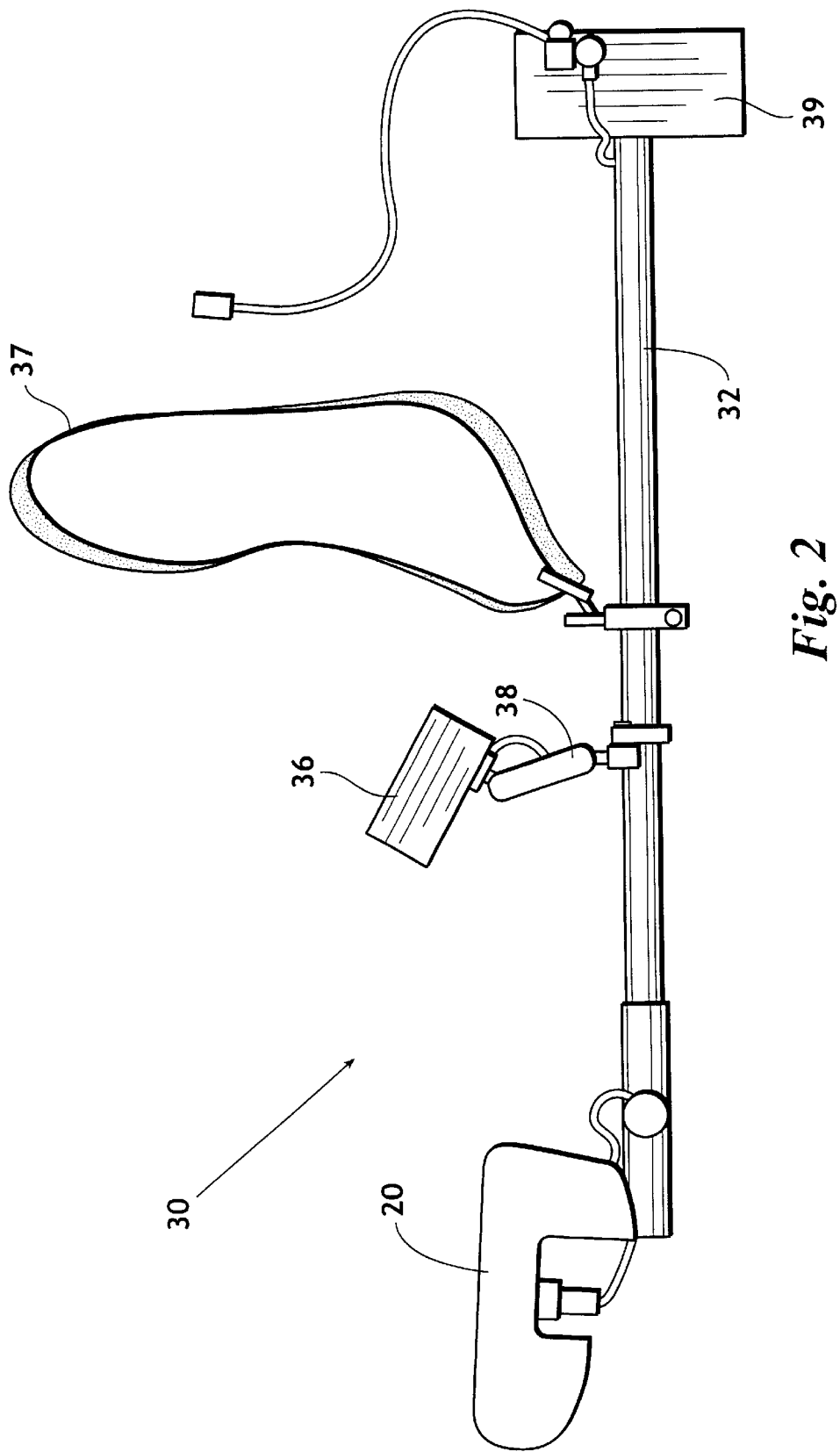
FIG. 2 provides a perspective view of a hand held analyzer wherein an active sensor is employed.

The inventive method may also be used to determine fertilizer requirements for incorporation into a prescription map or even for fertilizer requirements for a blanket application of fertilizer to an entire field. A method for making such measurements is with a handheld analyzer 30 as shown in FIG. 2. Analyzer 30 comprises: an elongated beam 32; reflectance sensor 20 secured to the forward end of beam 32; a controller 36 mounted centrally along beam 32; a pistol grip 38 for holding analyzer 30; and battery 39 placed at the end of beam 32 opposite the sensor to provide power for sensor 20 and to counter balance analyzer 30 while in use. Optionally, shoulder strap 37 may be used to reduce stress on the operator.

Generally speaking, a sensor may either emit light which is then reflected back to a receiver, referred to herein as an "active sensor" since the sensor actively produces its own light, or a sensor may take advantage of available light to measure reflectance properties which, for purposes of this invention, is referred to as a "passive sensor". Either sensor is well suited for use on analyzer 30. Simply by way of example and not limitation, analyzer 30 is shown with an active sensor 20.

Continuing with FIG. 2, preferably controller 36 is a compact computer such as a PDA, or the like. Such devices include a display for providing instructions and data to the operator. In addition, controller 36 preferably includes features such as: an interface for a removable, non-volatile memory for logging crop data; a global positioning system interface such as an USB port or conventional serial port for receiving and storing field coordinates; and a tachometer input for receiving pulses from a shaft encoder when used on a vehicle. These inputs allow analyzer 30 to store in non-volatile memory, the condition of plants located at each particular site in a manner which allows later correlation of such data to a specific site. The stored data may then be used in forming a prescription map or for later analysis.

Figure 4:
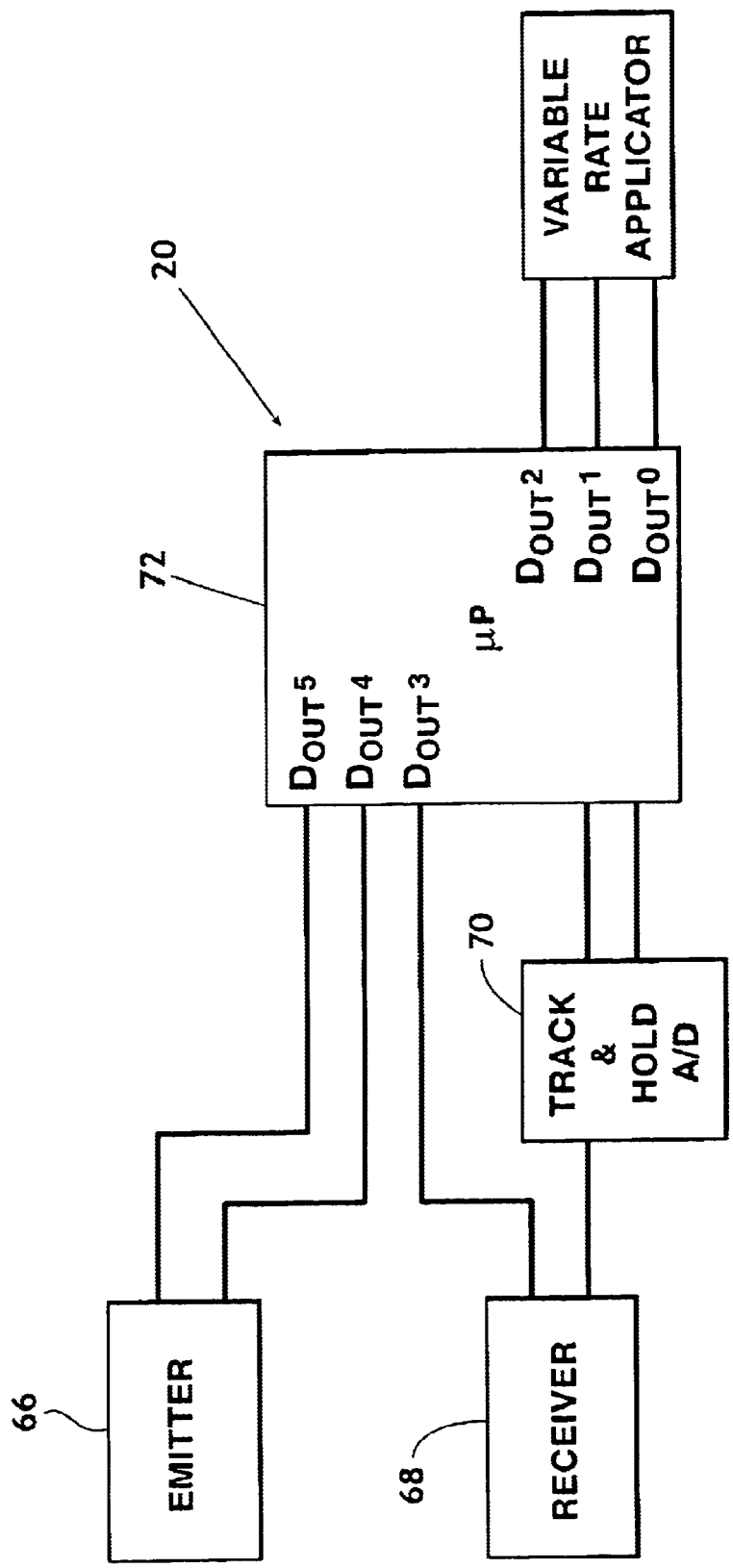
FIG. 4 provides a block diagram of an active reflectance sensor suitable for use with the inventive method.

An active sensor suitable for use with the present invention is described in the aforementioned co-pending U.S. patent application Ser. No. 09/912,077 entitled "Optical Spectral Reflectance Sensor and Controller." Referring to FIG. 4, active sensor 20 comprises: an emitter 66; a receiver 68; an analog to digital converter 70; and a microprocessor 72.

Figure 5:
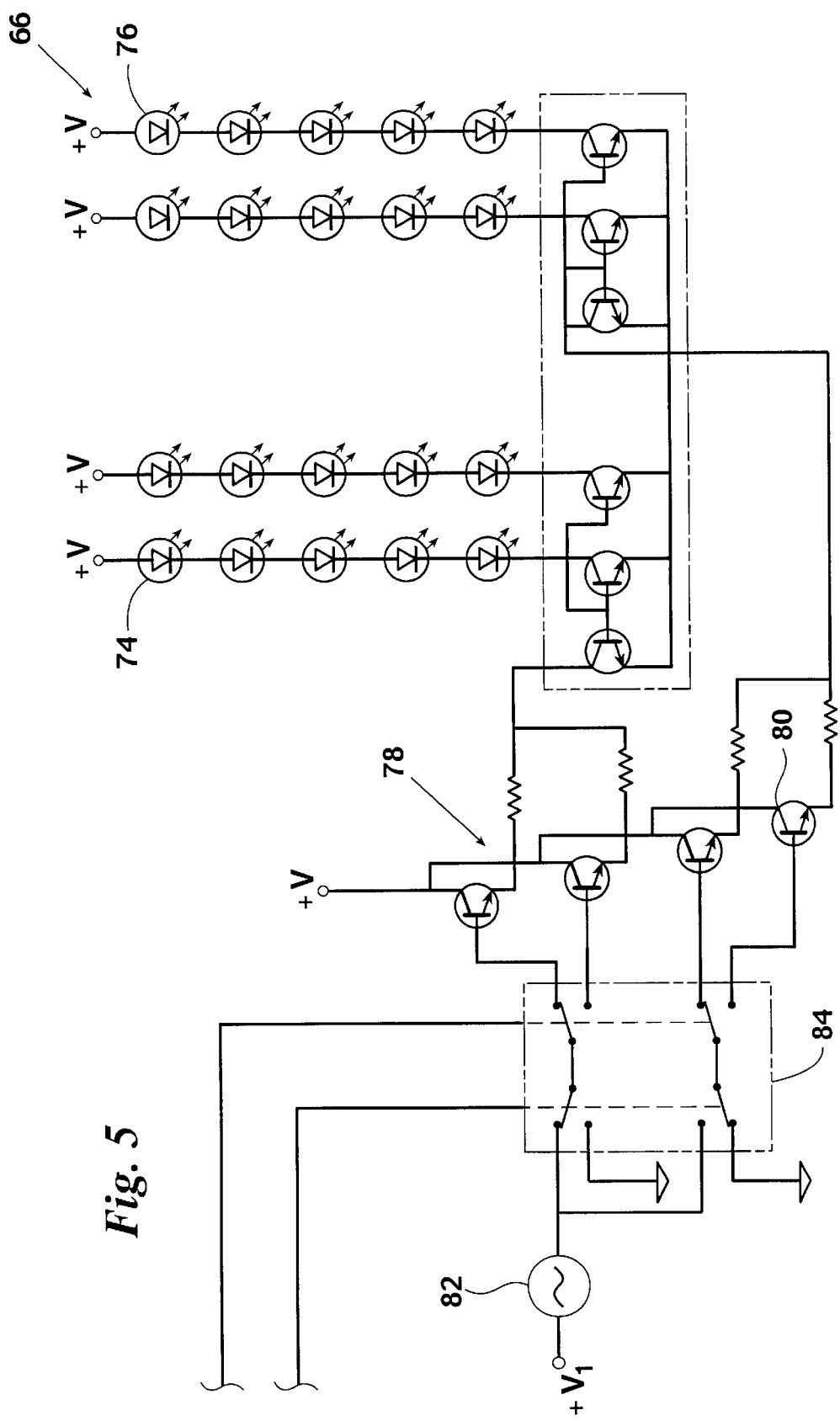
FIG. 5 provides a schematic representation of an emitter circuit employed in the active reflectance sensor.

Referring next to FIG. 5, emitter 66 includes: a red light source 74, preferably a plurality of LED devices; an infrared light source 76, likewise preferably a plurality of LED devices; amplifiers 78 and 80 for driving LED devices 74 and 76, respectively; an oscillator 82 for modulating sources 74 and 76; and an analog selector 84 to allow microprocessor 72 (FIG. 4) to activate either the red light source 74 or the near infrared light source 76.

Figure 6:
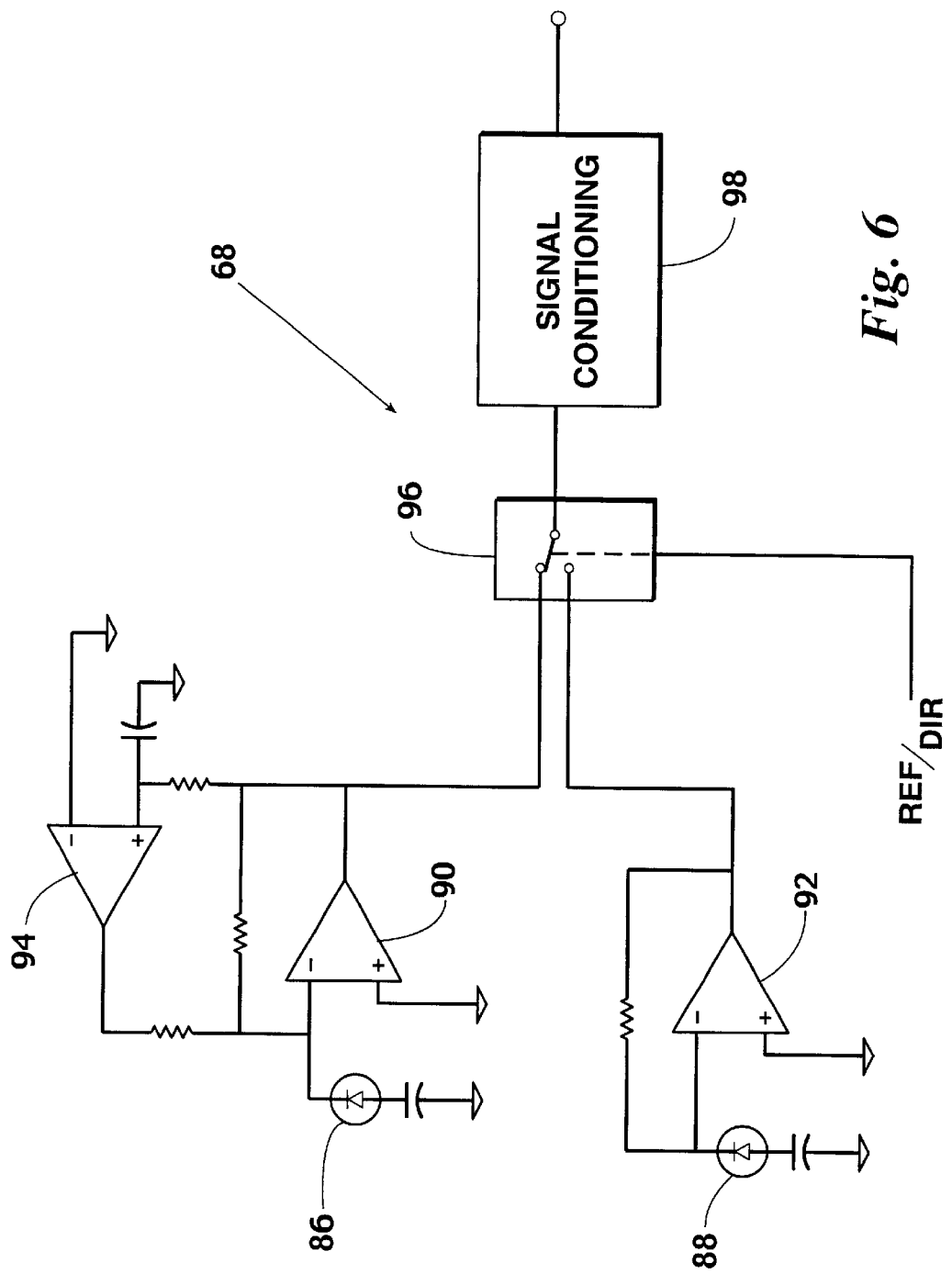
FIG. 6 provides a schematic representation of a receiver circuit employed in the active reflectance sensor.

Turning now to FIG. 6, receiver 68 includes: a reflected light photo detector 86 for receiving light reflected by an object in the view of the sensor 20; a direct light sensor 88 for receiving incident light from either the red source 74 or the near infrared source 76; amplifiers 90 and 92 for amplifying the signals received by detectors 86 and 88, respectively; amplifier 94 for compensating for ambient light striking detector 86; analog selector 96 for selecting between the signals of detector 86 or detector 88; and a signal conditioner 98 which bandpass filters the selected signal at the modulation frequency to discriminate between light from the emitter and ambient light.

Reflectance of the plant to red light is determined by dividing the output of the reflected light detector 86 by the output of the direct detector 88 while the red source 74 is active and the reflectance of the plant to near infrared is determined by dividing the output of the reflected light detector 86 by the output of the direct detector 88 while the infrared source 76 is active.

Figure 3:
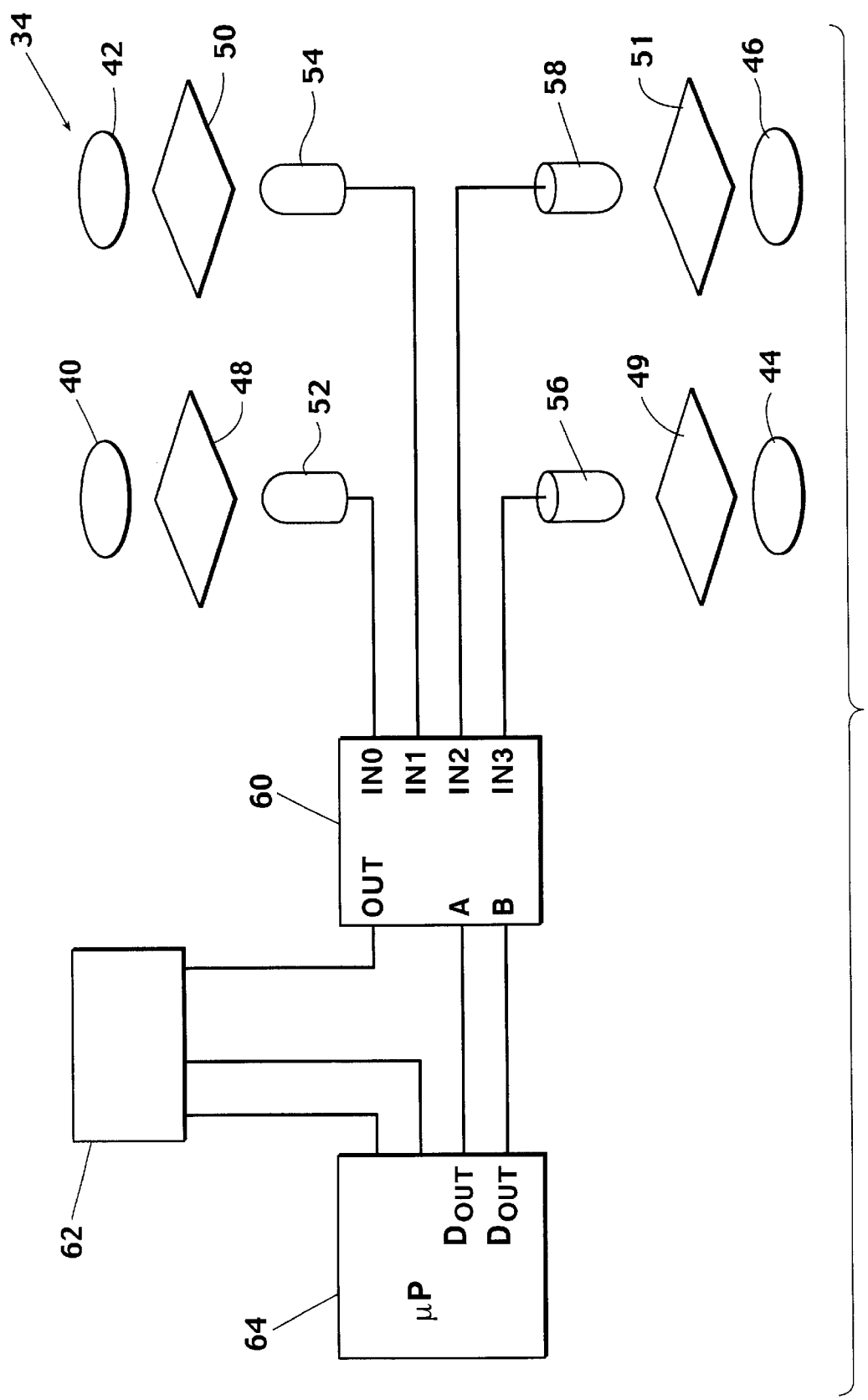
FIG. 3 provides a block diagram of a passive reflectance sensor suitable for use with the inventive method.

It should be noted that, while handheld sensor 30 and spreader 24 (FIGS. 1A and 1B) are described herein as incorporating an active sensor 20, a passive sensor could easily be used instead in either device. An example of a suitable passive sensor 34 is shown in FIG. 3. Passive sensor 34 includes: two up-looking diffusers 40 and 42; two down-looking lens 44 and 46; an up-looking red filter 48 in optical alignment with diffuser 40; an up-looking near infrared filter 50 in optical alignment with diffuser 42; a down-looking red filter 49 in alignment with lens 44; a down-looking near infrared filter 51 in optical alignment with lens 46. For each lens 40–46 there is a corresponding photo detector 52–58. The output of each detector is directed to the input of an analog multiplexer 60 and to an analog to digital converter 62. Preferably, analog to digital converter 62 provides 16 bits of resolution, however the resolution of converter 62 is not critical. Converter 62 is in communication with microprocessor 64 such that, microprocessor 64 can select a particular photo detector via multiplexer 60, perform a conversion on the signal produced by the detector, and read the converted value from converter 62.

Reflectance for red is then calculated by dividing the intensity of reflected red light, as read from down-looking photo detector 56, by the intensity of the incident red light, as read from up-looking photo detector 52. The reflectance at near infrared is calculated in a similar manner by dividing the intensity of reflected near infrared, as read from detector 58 by the intensity of incident near infrared, as read from detector 54.

Although, as will become apparent from the discussion hereinbelow, the preferred embodiment of the inventive method requires reflectance information for both red light and near infrared light, the means by which the information is obtained is not critical. Thus, while two techniques are given by way of example, the inventive method is not so limited and, by way of further example and not by way of limitation, reflectance information could instead be determined by techniques such as aerial survey, image processing of video information, or the like.

The normalized difference vegetation index (NDVI) provides an estimate of the biomass of a plant at the time of measurement. One method of determining NDVI is through the scanning of a plant, or group of plants, to determine the reflectance of the plant at red light having a wavelength of approximately 660 nanometers and the reflectance of the plant at near infrared light having a wavelength of approximately 780 nanometers. NDVI is then calculated as follows:

$$NDVI=(NIR-red)/(NIR+red)$$

where "NIR" is reflectance at near infrared light and "red" is the reflectance value at red light. It should be noted that NDVI is a dimensionless value.

Typically, a reflectance sensor will include a computing device. The calculation of NDVI within the sensor is well within the abilities of such computing devices. Thus, it is preferable that the NDVI calculation is implemented as software or firmware either within the sensor or in communication with the sensor. In a preferred embodiment, computer instructions are encoded in a device readable by the computer, i.e., a RAM device, a ROM device, whether PROM, EPROM, EEPROM, or a masked device, flash RAM, a RAM card, a ROM card, a floppy disk, a magnetic disk, a magnetic tape, a magneto-optical disk, an optical disk, a CD-ROM disk, a DVD disk, or the like.

By way of example and not limitation, when the inventive method is used with wheat, reflectance readings are generally collected between 80 and 150 days after planting. The dates where readings are collected generally range between Feekes physiological growth stage 4 wherein leaf sheaths are beginning to lengthen, and stage 6 wherein the first node stem is visible. Preferably, reflectance readings are taken over a surface area small enough that there is little variability in soil test parameters over the scanned area. A surface area of approximately 1 square meter has proven adequate although more preferably, each site will have a surface area on the order of 0.6 square meters.

As a preliminary matter, a nutrient response index ($RI_{NDVI}$) for the field must be determined. A pre-plant non-limiting, or nutrient rich, strip will be established in each field at, or near, planting time. Regardless of the particular fertilization practice employed by a farmer, the non-limiting strip can be used to determine the likelihood of obtaining an in-season response to a particular nutrient, specifically tailored to that particular farmer's practice. Prior to applying topdress fertilizer, the non-limiting strip will be scanned to determine NDVI, as will be a parallel strip fertilized according to the conventional practice of the farmer. The response index may then be calculated as:

$RI_{NDVI}$=NDVI from the non-limiting strip/NDVI from the farmer practice strip.

Where a nutrient rich non-limiting strip was not established at or before planting, or the nutrient was not applied prior to planting, $RI_{NDVI}$ may instead be determined by sensing the spatial variability in NDVI reading from one pass through the entire field. The response index computed from spatial variability ($RI_{SV}$) is calculated by:

$RI_{SV}$=(Average NDVI from one pass through the field+1 standard deviation)/(Average NDVI from the same pass−1 standard deviation)

Also prior to application of the topdress fertilizer the number of growing days since planting (GDP) must be determined. "GDP" is defined as the number of days in which the plant is actively growing. A growing day is one where the average temperature, $(T_{min}+T_{max})/2$, is greater than 4.4 degrees Celsius. This information is readily available in virtually any agricultural area. Typically, growing days are tracked by government agencies, universities, large farming operations, and the like. It should be noted that the inventive method may also use growing days since emergence in lieu of growing days since planting. GDP may be adjusted by excluding days where ambient temperatures are low enough that the crop does not actively grow.

To calculate fertilization requirements, a plant or group of plants is next scanned to determine the plant's NDVI. Assuming GDP is greater than zero, the in-season estimated yield index (INSEY) and the potential yield level ($YP_0$) with no added nutrient are calculated as follows:

$INSEY=NDVI/GDP$ $YP_0=365.8e^{(INSEY/0.0035267)}$ ($YP_0$ in kg/ha)

Next, the predicted attainable yield with added nutrient X ($YP_X$) is calculated as:

$YP_X=YP_0*RI_{NDVI}$ ($YP_X$ in kg/ha)

where the response index was calculated as previously described specific to the nutrient in question. It should be noted that two limits are preferably imposed on this calculation, namely: 1) $RI_{NDVI}$ cannot exceed 3.0; and 2) $YP_N$ cannot exceed $YP_{MAX}$ where $YP_{MAX}$ is the biological maximum for a specific crop, grown within a specific region, and under defined management practices. The value of 3.0 for maximum $RI_{NDVI}$ may vary for a specific crop, grown in a specific region under different conditions.

The predicted percent of nutrient X in the grain (PXG) is obtained from known averages in a specific crop type. It should be noted that "crop type" refers to a particular type of grain, rather than a species of grain, i.e., winter wheat, spring wheat, hard red, soft red, hybrid corn, sorghum, rice, etc. PXG is multiplied by $YP_X$ to obtain the mass (in kg) of X nutrient taken up in the grain. The average percent of a particular nutrient in a specific grain may be adjusted for regional variations.

Next, the predicted grain nutrient uptake (GXUP) at $YP_X$ and $YP_0$ are calculated:

$GXUP_{YPX}=PXG*YP_X$ kg/ha $GXUP_{YP0}=PXG*YP_0$ kg/ha

From these values, the in-season topdress fertilizer nutrient X requirement (FXR) is given by:

$FXR=(GXUP_{YPX}-GXUP_{YP0})/EFF_X$

Where $EFF_X$ is the maximum nutrient use efficiency of an in-season application of nutrient X in the manner applied. $EFF_X$ via in-season foliar application for most required plant nutrients is approximately 0.7. $EFF_P$ is known to be approximately 0.5 for topdress phosphorus.

It should be noted that this procedure produces results which may be dramatically different from the procedures in current use. The inventive method prescribes increased nutrient application rates in areas of the field with high yield potential as indicated by INSEY and reduced nutrient application rates in areas of the field with lower yield potential. This is contrasted with prior thinking where fertilizer is applied in an attempt to bolster production in areas of a field having low production and withheld in areas of a field having relatively high production. Thus it can be seen that the purpose of the inventive method is to restrict the application of a nutrient to just the amount required such that the nutrient is not the limiting factor in crop yield.

It should also be noted that while the discussion of preferred embodiment is provided with regard to using the inventive method to improve the efficiency of farming cereal grain crops such as wheat, barley, corn, etc., the inventive method has far broader application and is useful for improving the growth of virtually any plant. While the constants used in the calculation of $YP_0$ may vary somewhat between various types of plants, the steps to arrive at the required fertilization rate are the same.

To summarize, the inventive method includes the steps of: determining NDVI of both a non-limiting test strip and a test strip planted according to conventional practice; calculating a response index for the field based on the NDVI values of the test strips; determining the NDVI, INSEY, and $YP_0$ for a site; extrapolating a predicted attainable yield, $YP_X$; and determining the nutrient requirement as the difference between the grain nutrient removal at $YP_X$ and at $YP_0$, adjusted by the efficiency of the plant in utilizing the available nutrient.

As will be apparent to those skilled in the art, the inventive method is well suited for incorporation into a software program for execution by a microprocessor or other computing device. When combined with a reflectance sensor as described hereinabove, the inventive method is ideally suited for use in a system which measures reflectance, calculates the requirements for nutrient X (FXR), and controls a variable rate applicator, in real time. In such a system, the calculations detailed hereinabove may be reduced to one or more computer programs stored on a computer readable storage device. Preferably, the program will be arranged in a modular fashion such that individual modules are responsible for each calculation and each control function.

Figure 7:
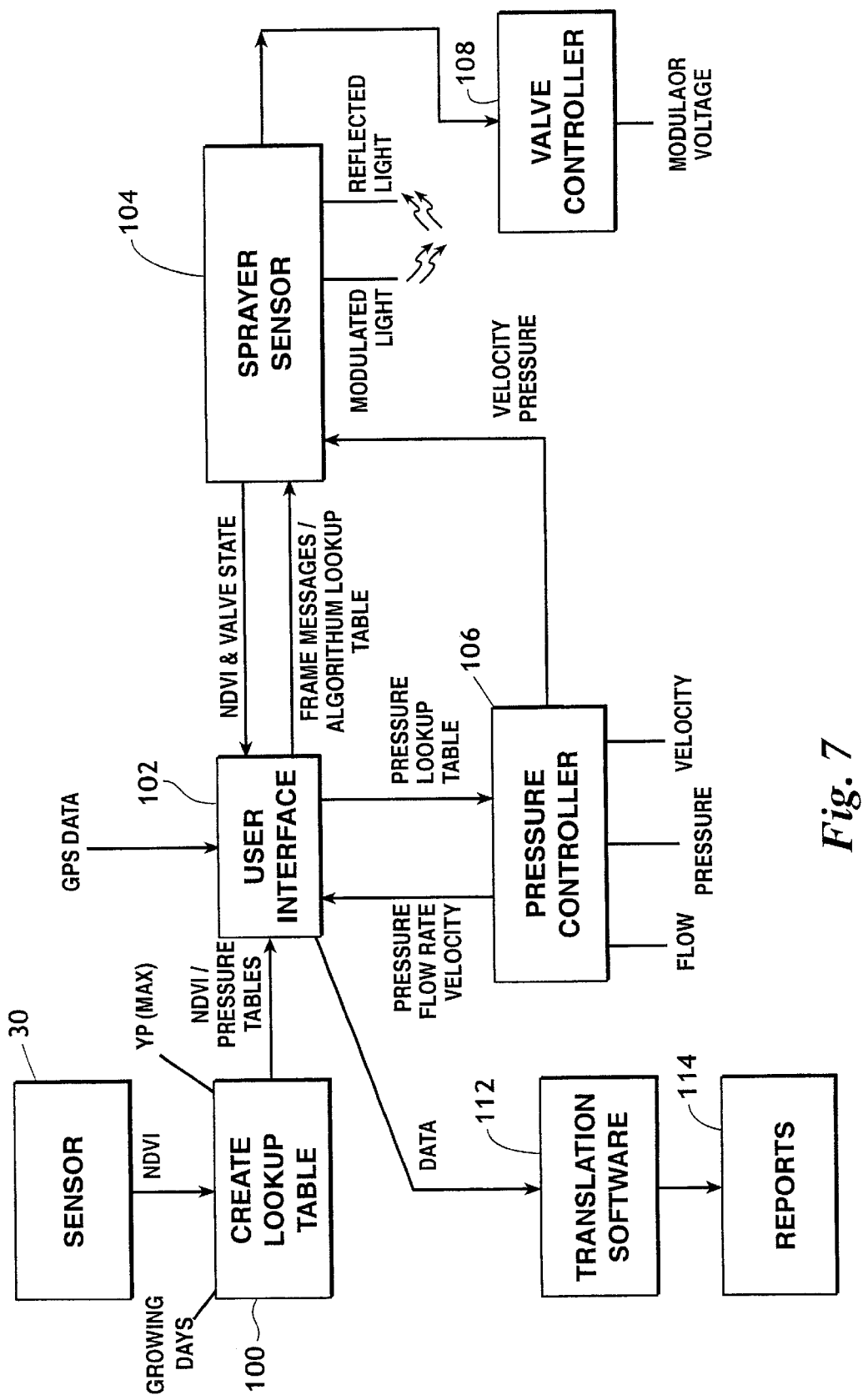
FIG. 7 provides a block diagram of a preferred system for practicing the inventive method.

As a practical matter, it may not be desirable to perform all of the above described steps in a spraying apparatus at the time of spraying. As will be apparent to those skilled in the art, as sites get smaller, the amount of processing required to keep up with a sensor and its associated sprayer gets larger. Thus, to the degree possible, it may be desirable to perform as much of the calculation as possible, and reduce as many variables to constants as possible, prior to treating a field. A system for reducing the computing workload at the sprayer is shown in FIG. 7.

As an initial step, a handheld sensor 30 is used to scan the nutrient rich non-limiting strip and the strip planted according to conventional practice to determine NDVI for each strip. These values are then entered into a computer 100 along with the number of growing days since planting and $YP_{MAX}$ for the specific crop in the local region. Computer 100 then executes a program adapted to the particular crop, the particular nutrient, and the method of application to generate lookup tables for application rates of a fertilizer relative to the NDVI of a site, the sprayer pressure, and vehicle speed. As can be seen in reviewing the equations used in the inventive method, NDVI of a site is the only variable information at the actual time of spraying. Thus, a lookup table for prescribed amounts of a nutrient may be generated for discrete NDVI values over a practical range of NDVI. As will be appreciated by those skilled in the art, drawing a value from a lookup table is a relatively simple task for a processor.

In addition to nutrient amounts, as determined above, prior to entering the field it is possible to generate lookup tables to convert nutrient amounts to sprayer rates. For a given amount of nutrient, a rate of application may be calculated, and a table of rates built, relative to vehicle speed and sprayer pressure.

These lookup tables are then transferred to a computer 102 located on the vehicle 24 (FIG. 1) by way of a memory card, serial port, network connection, wireless interface, or the like. Computer 102 provides the user interface for the operator of the vehicle to allow control of the system and feedback as the application process progresses. Computer 102 forwards NDVI lookup tables to the reflectance sensor 104 and pressure lookup tables to pressure controller 106. With the tables resident at systems 104 and 106, the system is ready to commence the application process.

Pressure controller 106 monitors the flow and pressure of the spray media, as well as the velocity of vehicle 24. These values are returned to computer 102 for display to the operator and for storage for later analysis. Controller 106 also supplies pressure and velocity information to sensor 104.

As vehicle 24 passes through the field, the beginning of each site is identified in a frame message transferred from computer 102 to sensor 104. Upon receiving the message, sensor 104 scans the site, determines an NDVI for the site, and looks up a valve state based on NDVI, pressure, and velocity. Sensor 104 returns NDVI and the valve state values to computer 102 for display to the operator and to be stored for later analysis. The valve state value is also sent to valve controller 108 which, in turn, selectively opens individual valves of an array of binary weighted valves to deliver the appropriate amount of nutrient to the site.

It should be noted that, if controller 36 (FIG. 2) of sensor 30 includes a memory card interface, the memory card can be removed from sensor 30 and connected to computer 100 to provide the necessary information to calculate the response index. Computer 100 can then write the specific lookup tables to the memory card as they are produced. The memory card can then be transferred from computer 100 to computer 102 where the lookup tables are sent to the appropriate systems 104 and 106. As the spraying operation progresses, GPS data, site NDVI values, valve states, and pressure, flow, and velocity data can be written to the memory card as spraying progresses. After the spraying operation, the information stored on the card can be processed at 112 to produce reports at 114 and archived to provide guidance for pre-plant fertilization in the next growing season as well as for use in making other crop and field management decisions.

With regard to calculating a predicted yield ($YP_0$), it is worth noting that research has shown the INSEY index to be a reliable predictor of final wheat grain yield for 24 sites over a four-year period. Of particular importance was the finding that a single equation was able to predict yield over a broad production range, 0.5 Mg/ha to 6.0 Mg/ha.

It should also be noted that the limits provided in regard to the calculation of attainable yield ($YP_X$) restrict the method to predicting reasonable production levels. Since $YP_X$ is extrapolated from observed growing conditions, it is important that reasonable biological and agronomic limits are applied to a predicted yield under optimum management and that a predicted yield is not extrapolated beyond reasonable expectations.

Finally, it should also be noted that, while farming applications of the inventive method were discussed in relation to the preferred embodiment, the invention is not so limited. The inventive method could be used to improve the efficiency of the application of fertilizer in virtually any crop. While the constants in the equations given above may vary from crop-to-crop, the inventive method is otherwise applicable to virtually any type of plant and can be applied with minor modification to any crop nutrient whose projected need could be based on predicted uptake in the grain, derived from predicted yield or $YP_0$. In addition, the inventive method is not limited to liquid fertilizers, but can also be used in the application of solid and gaseous forms. Accordingly, the terms "sprayer" and "nozzle" should be interpreted broadly to include applicators appropriate to the form of fertilizer selected.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A method for in-season nutrient application including the steps of;
   (a) determining a nutrient response index for a field;
   (b) determining the normalized difference vegetation index of an area to fertilize;
   (c) determining a predicted crop yield for said area;

(d) determining an attainable crop yield for said area;

(e) determining nutrient removal at said predicted crop yield;

(f) determining nutrient removal at said attainable crop yield;

(g) determining the amount of additional nutrient which must be supplied to achieve said attainable crop yield; and (g) providing communication of said amount of nutrient.

2. The method of claim 1 wherein step (a) includes the substeps of:

(a) determine a nutrient response index for a field by the substeps of:
 (i) providing a first area treated with a particular nutrient such that said first area is a non-limiting fertilized area;
 (ii) providing a second area treated with a predetermined amount of nutrient;
 (iii) determining the normalized difference vegetation index for said first area;
 (iv) determining the normalized difference vegetation index for said second area; and
 (v) dividing said normalized difference vegetation index for said first area by said normalized difference vegetation index for said second area.

3. The method of claim 1 wherein step (b) includes the sub steps of:

(b) determining the normalized difference vegetation index of an area to fertilize by performing the steps of:
 (i) determining the reflectance of the vegetation in said area to red light;
 (ii) determining the reflectance of the vegetation in said area to near infrared light;
 (iii) dividing the difference of the reflectance determined step (b)(ii) minus the reflectance determined in step (b)(i) by the sum of the reflectance determined in step (b)(i) and the reflectance determined in step (b)(ii).

4. The method of claim 3 wherein the reflectance of the vegetation in said area to red light and the reflectance of the vegetation in said area to near infrared light are determined by scanning said vegetation with a reflectance sensor.

5. The method of claim 1 wherein step (c) includes the substeps of:

(c) determining a predicted crop yield for said area by performing the steps of:
 (c)(i) determining the number of growing days since the planting of said crop;
 (c)(ii) calculating the in-season estimated yield index for said area by dividing the normalized difference vegetation index by the number of growing days;
 (c)(iii) calculating the predicted crop yield for said area as a function of the in-season estimated yield index for said area.

6. The method of claim 1 wherein said attainable crop yield is determined by multiplying said predicted crop yield times said response index.

7. A device adapted for use by a digital computer wherein a plurality of computer instructions defining the method of claim 1 are encoded, said device being readable by said digital computer, said computer instructions programming said digital computer to perform said method, and, said device being selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

8. A method for determining an application rate for nutrient fertilizer including the steps of;

(a) determining a nutrient response index by measuring the NDVI of a nutrient rich test strip and the NDVI of a test strip fertilized according to conventional practice;

(b) generating a lookup table wherein values stored in the table are indicative of nutrient requirements relative to NDVI values;

(c) transferring said lookup table to an apparatus for delivering the nutrient, said apparatus for delivering the nutrient having at least one sensor thereon for measuring crop NDVI and at least one controllable nozzle thereon for delivery of the nutrient to a crop;

(d) scanning a site with said sensor to determine crop NDVI at said site;

(e) drawing a nutrient requirement from said lookup table based said crop NDVI;

(g) controlling said controllable nozzle to deliver said nutrient requirement to said site.

9. A device adapted for use by a digital computer wherein a plurality of computer instructions defining step (b) of claim 8 are encoded, said device being readable by said digital computer, said computer instructions programming said digital computer to perform said method, and, said device being selected from the group consisting of computer RAM, computer ROM, a PROM chip, flash RAM, a ROM card, a RAM card, a floppy disk, a magnetic disk, a magnetic tape, a magneto-optical disk, an optical disk, a CD-ROM disk, or a DVD disk.

* * * * *